Jan. 20, 1948.　　　G. W. HOLMES　　　2,434,696
THERMOSTATIC SWITCH AND HOLDER THEREFOR
Filed May 26, 1945　　　2 Sheets-Sheet 1
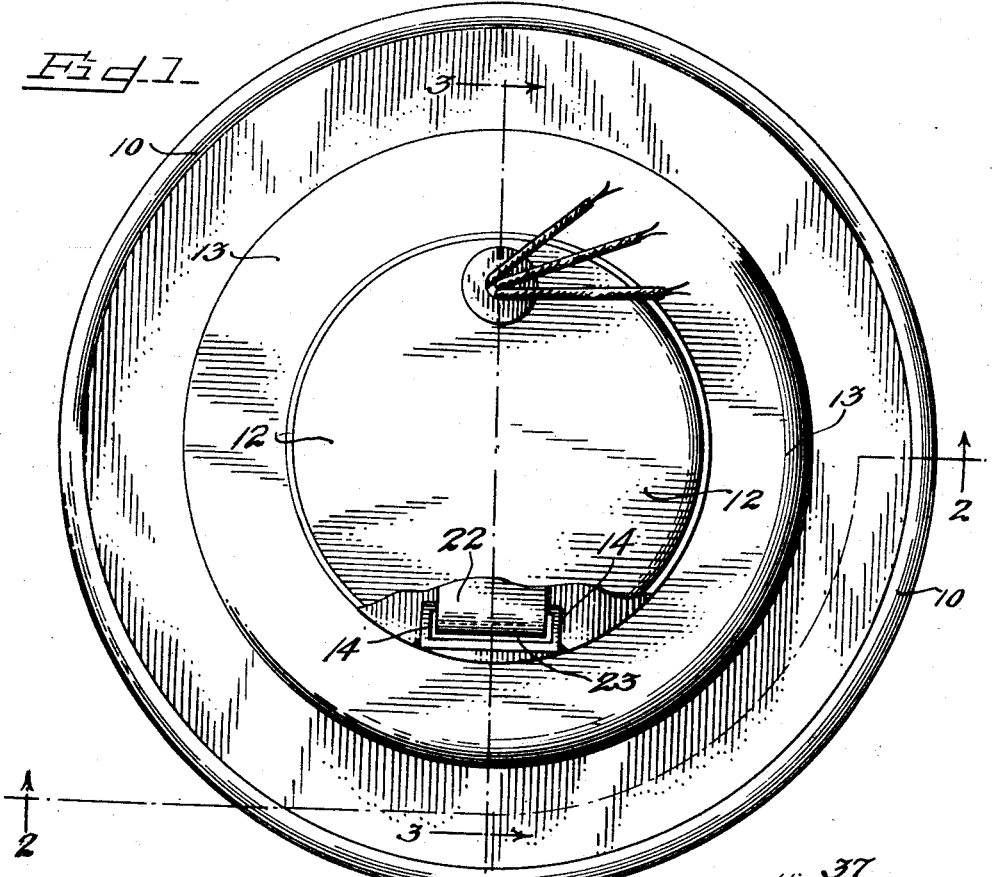
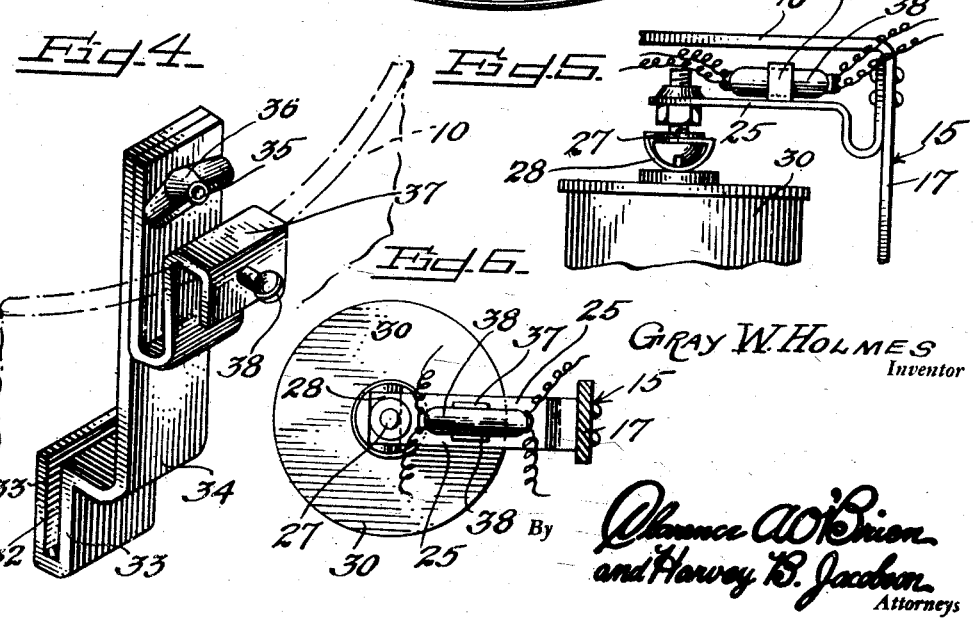
Gray W. Holmes
Inventor Jan. 20, 1948.    G. W. HOLMES    2,434,696
THERMOSTATIC SWITCH AND HOLDER THEREFOR
Filed May 26, 1945    2 Sheets-Sheet 2
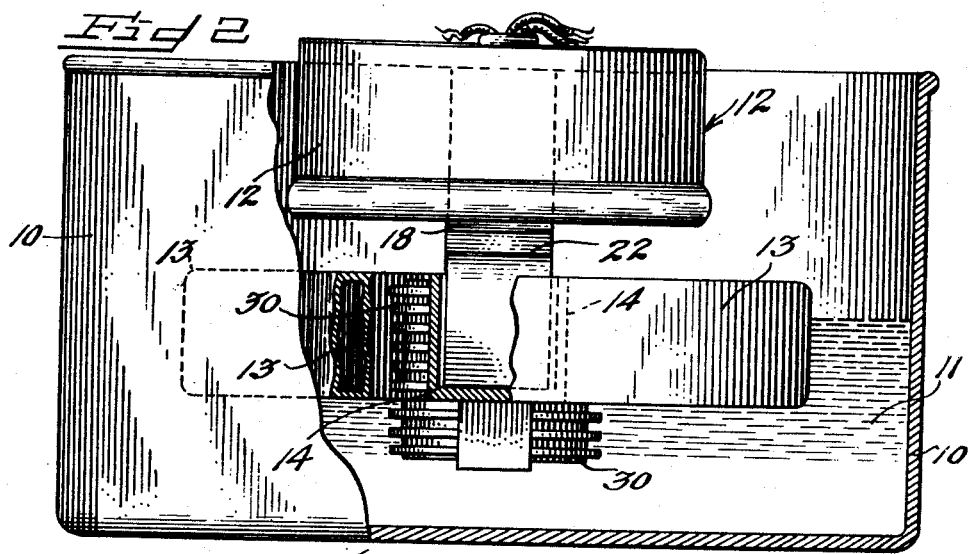
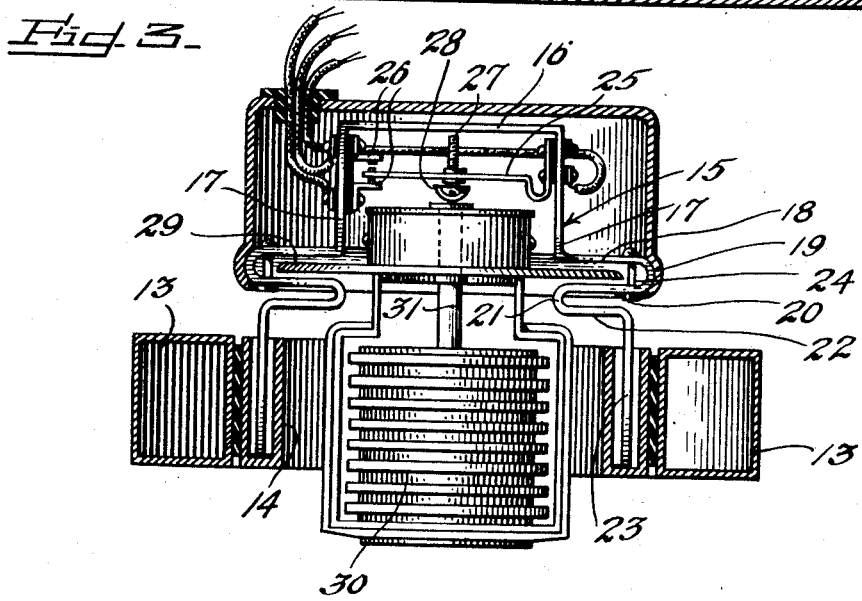
Gray W. Holmes
Inventor
By Clarence A. O'Brien
and Harvey B. Jacobson
Attorneys Patented Jan. 20, 1948

2,434,696

UNITED STATES PATENT OFFICE 2,434,696

THERMOSTATIC SWITCH AND HOLDER THEREFOR

Gray W. Holmes, Miller, Mo.

Application May 26, 1945, Serial No. 595,949

2 Claims. (Cl. 200—140)

This invention relates to a thermostatic switch and more particularly to an adapter, or holder by means of which a liquid controlled thermostat such as is commonly employed in the cooling system of a motor vehicle may be utilized for controlling an electrical switch.

The primary object of the invention is to so manipulate a switch that the flow of current therethrough is regulated in response to thermal changes in a liquid.

Another object of the invention is automatically to regulate the application of heat to a liquid within a vessel so as to maintain a temperature relatively constant over a relatively long period of time.

A further object is to adapt a standard type of thermostat to the automatic control of the temperature of a liquid.

The above and other objects may be attained by employing this invention which embodies among its features a holder carrying a switch-arm and contact adapted to be engaged thereby for controlling the opening or closing of an electrical circuit, a thermostat associated with the switch-arm for controlling its movement in response to thermal changes in a liquid, and means to support or suspend the holder and its accompanying mechanism in such position that the thermostat will respond to thermal changes in the liquid.

Other features embody a substantially inverted U-shaped holder carrying near the bight portion the circuit controlling equipment and supporting between its legs a thermostatic unit for controlling the movement of the circuit controlling contact and a float upon which the U-shaped holder is supported in such a position that the thermostatic element contacts the liquid while the electrical equipment is held clear of it.

In the drawings:

Figure 1 is a top plan view of a vessel showing the float and thermostatic unit suspended therein, a portion of the unit being broken away to more clearly illustrate certain details of construction, Figure 2 is a side view partially in section and taken substantially along the line 2—2 of Figure 1, a portion of the float being broken away to more clearly illustrate certain details of construction, Figure 3 is a transverse sectional view taken substantially on a line 3—3 of Figure 1, Figure 4 is a perspective view of a bracket for supporting the device in a fixed position in a vessel, Figure 5 is a fragmentary view showing a modified form of control switch, and Figure 6 is a fragmentary plan view of Figure 5.

Referring to the drawings in detail a vessel 10 is adapted to contain a liquid 11 upon the surface of which my thermostatic device designated generally 12 is adapted to be suspended by a float 13. This float is substantially ring-shaped in form and may as suggested in Figure 1 be formed of a hollow body though in some instances I may find it desirable to employ a solid body of buoyant material. Carried at diametrically opposite points on the inner surface of the ring-shaped float 13 are sockets 14 the upper ends of which are open as will be readily understood upon reference to the drawings.

My thermostatic device 12 previously referred to comprises essentially a substantially inverted U-shape holder designated generally 15. This holder is made of a strip of material which is bent to form a bight portion 16 having depending legs 17 the lower ends of which terminate in outwardly bent portion 18, the outer ends of which are formed with return bands 19 forming inwardly extending jaw members 20. The inner ends of the jaw members are bent back upon themselves as at 21 forming outwardly extending portions 22 which terminate at their outer ends in depending supporting legs 23 which as shown are adapted to be received in the sockets 14 previously described. Extending through the outwardly bent portion 18 and the jaw member 20 near the return bends 19 are bolts 24 for a purpose to be more fully hereinafter described. It will be noted upon reference to Figure 3 that the depending leg portions 17 of the holder 15 are inwardly offset with relation to the leg portions 23 and carried by one of the inwardly offset leg portions 17 is a switch-arm 25, the opposite end of which is disposed between a pair of contacts 26, it being understood that the switch-arm and contacts are insulated electrically from the holder so as to avoid short circuiting. Carried intermediate the ends of the switch-arm is an adjusting screw 27 the head of which is turned downwardly and provided with a suitable insulating covering 28. The purpose of this adjusting screw will appear hereinafter.

Supported by its flange 29 which is adapted to be clamped between the outwardly extending portion 18 and the jaw 20 by tightening the bolts 24 on the flange 29 is a thermostat 30 of the type commonly employed in the cooling system of an automobile. As illustrated in Figure 3 the lower end of the thermostat projects for some distance below the lower ends of the legs 23 while the upper end of the thermostat carrying the push rod 31 is disposed well up toward the horizontally bent portion 22 of each leg. The upper end of the push rod when the thermostat is clamped in place aligns axially with the adjusting screw 27 of the switch-arm 25 so that by turning the screw the timing of the engagement of the switch-arm 25 with the contacts 26 may be regulated in accordance with the movement of the thermostat push rod 31.

The operation of the device so far may be readily followed by examination of the drawings as the lower end of the thermostat 30 as shown in Figure 2 is immersed in the liquid 11 when the device is in position on the float 13 thus it will be seen that as thermal changes take place in the liquid the push rod 31 will be moved in response to said thermal changes so as to cause the switch-arm 25 to engage one or the other of the contacts 26. The switch-arm of course is electrically connected in circuit with one or the other, or both of said contacts and this circuit may be so connected as to control the application of heat to the vessel 10 and consequently regulate the thermal conditions within the liquid 11.

In Figure 4 I have illustrated a bracket which is adapted to be attached to the side of the vessel 10 to support the holder 15 in a fixed position within the vessel. In using this holder, the float 13 is dispensed with and the lower end of one of the legs 23 is supported in the slot 32 formed between the legs 33 carried at the lower end of a vertical suspension bar 34. The upper end of this bar is attached by a bolt 35 and wing nut 36 to a bracket 37 which is adapted to be clamped by means of a set screw 38 to the side of the vessel 10. It will thus be seen that by securing the bracket 37 by means of the said screw 38 to the vessel 10 and then seating the lower end of one of the legs 23 of the holder 15 in the slot 32 the holder will be held in a fixed position within the vessel and will not rise and fall with the change of liquid level therein. This type of suspension for holder is particularly useful where it is desirable to cut off further heating of the liquid within the vessel when its level falls below a predetermined point.

In Figure 5 I have shown a modified form of switch which may be used in conjunction with my thermostatic controlled device. In this type of structure the switch-arm 25 instead of being in the electrical circuit is provided with a pair of clips 37 between which is clamped the outer shell or tube of a mercury switch 38. In this device the structure of the holder 15 is essentially the same as that previously described but the contacts 26 are omitted and the arm 25 may be shortened, being only long enough to hold the adjusting screw 27 in proper position to be engaged by the upper end of the thermostat push rod 31. The construction and operation of mercury switches of the type herein referred to is well known and therefore no detail discussion of them will be herein entered into.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A holder comprising a substantially inverted U-shaped body, a switch arm carried by one leg of the body near its junction with the bight portion thereof, at least one contact carried by the opposite leg of the U-shaped body near its junction with the aforesaid bight portion, said contact being adapted to cooperate with the switch arm in opening and closing an electrical circuit, and a clamp at the lower end of each leg to support a conventional thermostat in operative relation with a switch arm.

2. A thermostatic switch which includes a ring shaped float having a pair of diametrically disposed sockets opening upwardly, an inverted substantially U-shaped body, a switch arm carried by one leg of the body near its junction with the bight portion thereof, a contact carried by the opposite leg of the body near the bight portion thereof for cooperation with the switch arm, a substantially U-shaped clamp at the lower end of each leg of the U-shaped body for suspending a conventional thermostat in operative relation to the switch arm and in a position to project through the float and a supporting leg depending from each clamp for entrance into one of the sockets on the float whereby the thermostat may be supported by the float in contact with a body of liquid.

GRAY W. HOLMES.

REFERENCES CITED

The following references are of record in the file of this patent:

UNITED STATES PATENTS

| Number | Name | Date |
| --- | --- | --- |
| 993,168 | Huberman | May 23, 1911 |
| 1,384,628 | Olson | July 12, 1921 |
| 1,921,684 | Lum | Aug. 8, 1933 |
| 2,169,857 | Treanor | Aug. 15, 1939 |
| 2,272,188 | Danielson | Feb. 10, 1942 |